United States Patent

Ochiai

(10) Patent No.: US 9,163,927 B2
(45) Date of Patent: Oct. 20, 2015

(54) RESOLVER

(71) Applicant: MINEBEA CO., LTD., Kitasaku-gun, Nagano (JP)

(72) Inventor: Takaaki Ochiai, Yachimata (JP)

(73) Assignee: Minbea Co., Ltd., Kitasaku-gun (JP)

( * ) Notice: Subject to any disclaimer, the term of this patent is extended or adjusted under 35 U.S.C. 154(b) by 35 days.

(21) Appl. No.: 14/027,857

(22) Filed: Sep. 16, 2013

(65) Prior Publication Data

US 2014/0125326 A1     May 8, 2014

(30) Foreign Application Priority Data

Nov. 8, 2012  (JP) ................. 2012-246194

(51) Int. Cl.
| | |
|---|---|
| *G01D 5/245* | (2006.01) |
| *B60K 7/00* | (2006.01) |
| *G01B 7/30* | (2006.01) |
| *H02K 1/18* | (2006.01) |
| *H02K 3/52* | (2006.01) |
| *G01D 5/244* | (2006.01) |
| *G01D 5/20* | (2006.01) |

(52) U.S. Cl.
CPC ............ *G01B 7/30* (2013.01); *G01D 5/24442* (2013.01); *H02K 1/185* (2013.01); *H02K 3/522* (2013.01); *G01D 5/20* (2013.01)

(58) Field of Classification Search
CPC ........ G01R 31/343; G01R 31/34; F16H 3/62; F16H 2200/2012
USPC ............... 324/765.01, 177, 139, 545, 154 R; 310/89, 68 B
See application file for complete search history.

(56) References Cited

U.S. PATENT DOCUMENTS

| | | | |
|---|---|---|---|
| 2011/0043196 A1* | 2/2011 | Fujita et al. ............ | 324/207.16 |
| 2012/0156078 A1* | 6/2012 | Guidry, Jr. .............. | 418/201.1 |
| 2012/0190491 A1* | 7/2012 | Gunji et al. ............. | 475/5 |

FOREIGN PATENT DOCUMENTS

| | | | |
|---|---|---|---|
| JP | 2010190598 | * | 2/2010 |
| JP | A-2010-172164 | | 8/2010 |
| JP | A-2010-178603 | | 8/2010 |
| JP | 2010190598 A | * | 9/2010 |
| JP | A-2010-190598 | | 9/2010 |

OTHER PUBLICATIONS

Fujimoto, Fixing Structure of Resolver and Cylindrical Case, JP.*

* cited by examiner

*Primary Examiner* — Patrick Assouad
*Assistant Examiner* — Taqi Nasir
(74) *Attorney, Agent, or Firm* — Oliff PLC (57) ABSTRACT

A resolver can have a stator and a housing fixed without requiring a special jig. The resolver includes a housing in an approximately cylindrical shape, a stator core in an approximately annular shape fixed to the inside of the housing, in which an exciting coil and a detecting coil are wound therearound, and a rotor arranged on the inside of the stator core, wherein the stator core is fixed to the housing by a C-shaped ring, a groove extending in a circumferential direction is provided on the inside of the housing, and the stator core is fixed to the housing by engaging the C-shaped ring with the groove.

5 Claims, 7 Drawing Sheets

RESOLVER

BACKGROUND OF THE INVENTION

1. Field of the Invention

The present invention relates to a resolver having specific structural characteristics for fixing a stator in a housing.

2. Description of Related Art

As a resolver structure in which a stator is fixed in a housing, techniques described in Japanese Unexamined Patent Application Laid-open No. 2010-190598, Japanese Unexamined Patent Application Laid-open No. 2010-178603, and Japanese Unexamined Patent Application Laid-open No. 2010-172164, are known. A technique using ultrasonic welding is disclosed in Japanese Unexamined Patent Application Laid-open No 2010-190598, a technique using an adhesive is disclosed in Japanese Unexamined Patent Application Laid-open No. 2010-178603, and a technique using a rivet is disclosed in Japanese Unexamined Patent Application Laid-open No. 2010-172164.

SUMMARY OF THE INVENTION

In the case in which the ultrasonic welding is used, specialized equipment for welding is required. In the case in which the adhesive is used, there are problems such as curing time, generation of outgasing after adhering, etc. In the case in which the rivet is used, the rivet and a specialized apparatus for using the rivet are required. In view of these circumstances, it is an object of the present invention to provide a resolver in which a stator and a housing are fixed without requiring a special jig.

A first aspect of the present invention has a resolver including: a housing in an approximately cylindrical shape, a stator core in an approximately annular shape fixed to the inside of the housing, in which an exciting coil and a detecting coil are wound therearound, and a rotor arranged on the inside of the stator core, in which the stator core is fixed to the housing by a C-shaped ring. According to the first aspect of the present invention, the stator core can be fixed to the housing by providing the C-shaped ring. This operation can be simply carried out without requiring a special jig.

A second aspect of the present invention has the resolver according to the first aspect, in which a groove extending in a circumferential direction is provided on the inside of the housing, and the stator core is fixed, to the housing by engaging the C-shaped ring with the groove. According to the second aspect of the present invention, the C-shaped ring is engaged with the groove, so that the stator core is fixed to the housing.

A third aspect of the present invention has the resolver according to the first aspect, in which an edge of the groove is formed in a tapered shape. According to the third aspect of the present invention, force for returning the C-shaped ring to an original shape (resiliency) is changed to force in an axial direction by the tapered shape of the edge of the groove. The stator core is pressed in an axial direction by this force in an axial direction due to the C-shaped ring. Therefore, a gap can be prevented from being formed and the stator core can be more strongly fixed.

A fourth aspect of the present invention has the resolver according to the first aspect, in which multiple convexities are provided on the inside of the housing, and the stator core is fixed in the housing by engaging the C-shaped ring with an undersurface of the convexity. According to the fourth aspect of the present invention, the stator core can be fixed to the housing by engaging the C-shaped ring between the convexities and the stator core.

A fifth aspect of the present invention has the resolver according to the first aspect, in which an edge of the convexity is formed in a tapered shape. According to the fifth aspect of the present invention, force for returning the C-shaped ring to an original shape (resiliency) is changed to force in an axial direction by the tapered shape of the edge of the convexity. The stator core is pressed in an axial direction by this force in an axial direction due to the C-shaped ring. Therefore, a gap can be prevented from forming and the stator core can be more strongly fixed.

A sixth aspect of the present invention has the resolver according to the first aspect, in which an adhesive is coated on a portion in which the C-shaped ring is arranged. According to the sixth aspect of the present invention, a more strongly fixing structure can be obtained by the adhesive.

A seventh aspect of the present invention has the resolver according to the first aspect, in which a stator receiving surface which contacts with the stator core in an axial direction is provided on the inside of the housing, and the stator core is sandwiched and held in an axial direction by the stator receiving surface and the C-shaped ring. According to the seventh aspect of the present invention, the stator core is held by sandwiching the stator receiving surface and the C-shaped ring inside of the housing.

According to the present invention, a resolver in which a stator and a housing are fixed without requiring a special jig can be provided.

PREFERRED EMBODIMENTS OF THE INVENTION

1. First Embodiment

Figure 1:
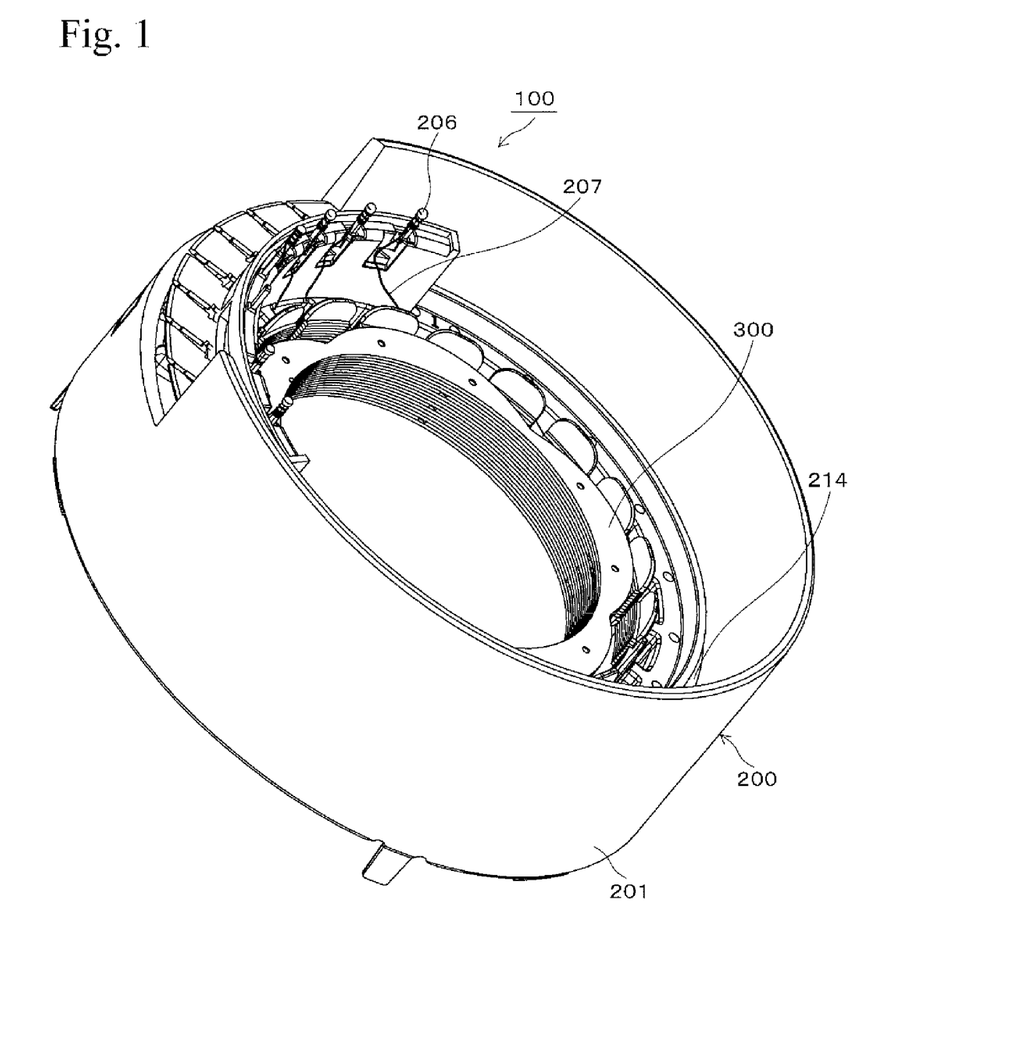
FIG. 1 is a perspective view showing a resolver of an embodiment of the present invention.
Figure 2:
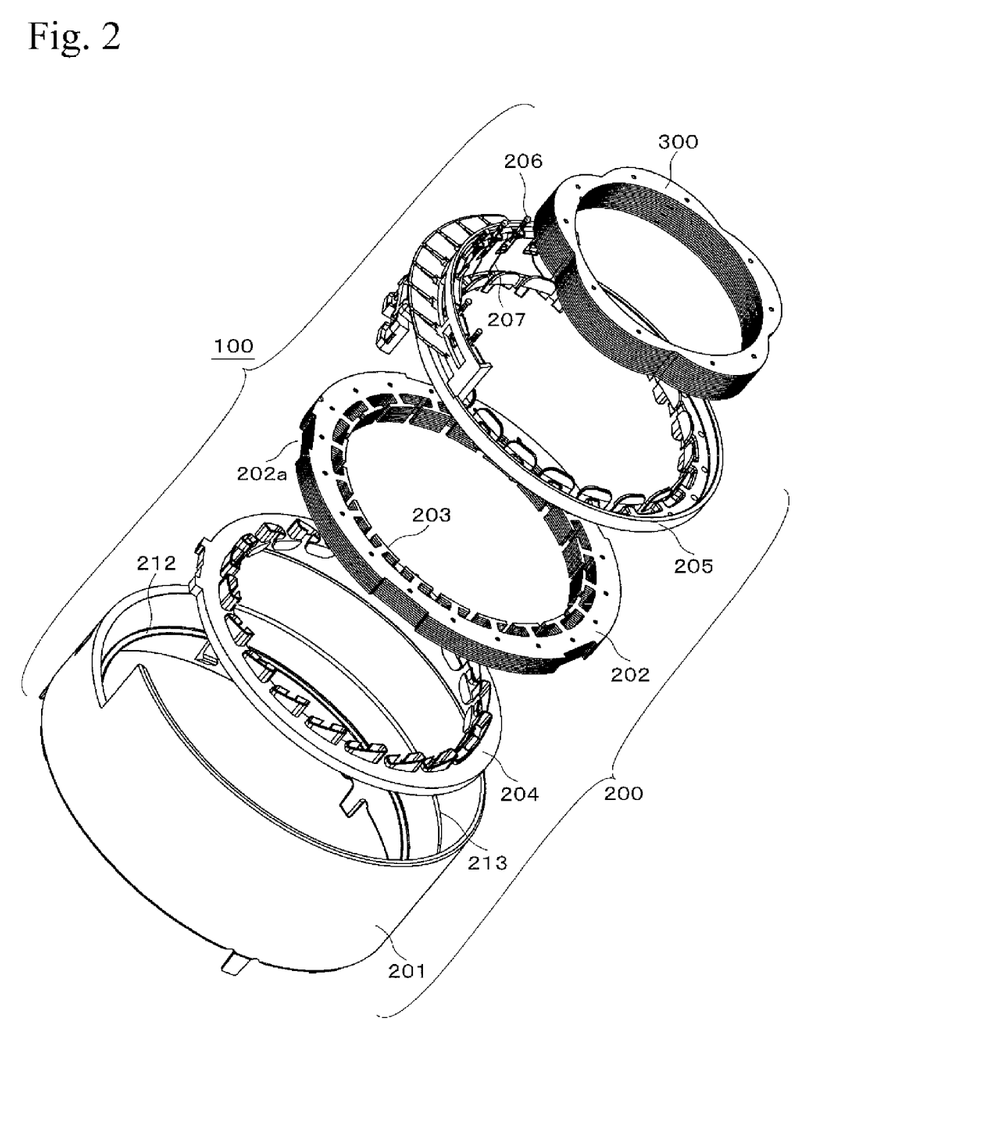
FIG. 2 is an exploded perspective view showing a resolver of an embodiment of the present invention.

FIG. 1 shows a resolver 100 of an embodiment of the present invention. FIG. 2 shows an exploded perspective view in which the resolver 100 is exploded in an axial direction. The resolver 100 is a VR type resolver, and it contains a stator 200 in an approximately cylindrical shape and a rotor core 300 rotatably arranged in the stator 200.

The stator 200 has a housing 201 in an approximately cylindrical shape formed by aluminum die-casting. A stator core 202 in an approximately annular shape is installed on the inside of the housing 201. A stator core receiving surface 212 for supporting one surface of the stator core 202 in an axial direction is formed on the inside of the housing 201, and the stator core 202 is contacted with this stator core receiving surface 212 in an axial direction.

The stator core 202 has a structure in which multiple tabular magnetic members, in approximately annular shape (for example, electromagnetic steel plate), are laminated in an axial direction. The stator core 202 has multiple salient poles 203 which extend in an axial center direction. Here, the "axis" means a rotational axis of the rotor core 300. The salient pole 203 is a part which functions as a magnetic pole on the stator, and the multiple salient poles are placed along a circumferential direction. A stator coil, which is not shown in FIGS. 1 and 2, is wound around the salient pole 203. The stator coil contains an exciting coil and an output coil (a sine phase detecting coil and a cosine phase detecting coil). Detailed explanation of the structure of the stator coil is here omitted since it is the same as that of a common resolver.

Insulators 204, 205 made of resin are installed on both surfaces in an axial direction of the stator core 202. Exposed parts of extending portions that extend in the axial center direction of the salient poles 203 are insulated by the insulators 204, 205, and the stator coils are wound around parts that are not shown in FIGS. 1 and 2. Lead-out lines 207 are led out from the stator coils, which are not shown, and the lead-out lines 207 are connected with terminal pins 206 embedded in the insulator 205.

Stator grooves 202a are formed on the stator core 202. The stator grooves 202a have recessed portions in an approximately rectangle shape when they are viewed from an axial direction, and have a groove structure in which a cross-sectional shape thereof extends in an axial direction. In this embodiment, the stator grooves 202a are formed at five positions on a circumference of the stator core 202, which are equiangular when they are viewed from an axial direction. Here, the number of the stator grooves 202a is not limited to that in this embodiment.

A rotor core 300 has an approximately annular shape having multiple convexities (five positions in this embodiment) on the circumference when it is viewed from an axial direction. The rotor core 300 has a structure in which multiple tabular magnetic members (for example, electromagnetic steel plate) are laminated in an axial direction. A rotor member in a cylindrical shape, which is not shown, is fixed to the inside of the rotor core 300, and a shaft member (a rotating shaft), which is not shown, is fixed to the center of the rotor member. This rotating shaft is rotatably held on the housing 201 by a bearing, which is not shown, and the rotor core 300 can be rotated to the stator 200.

Figure 3:
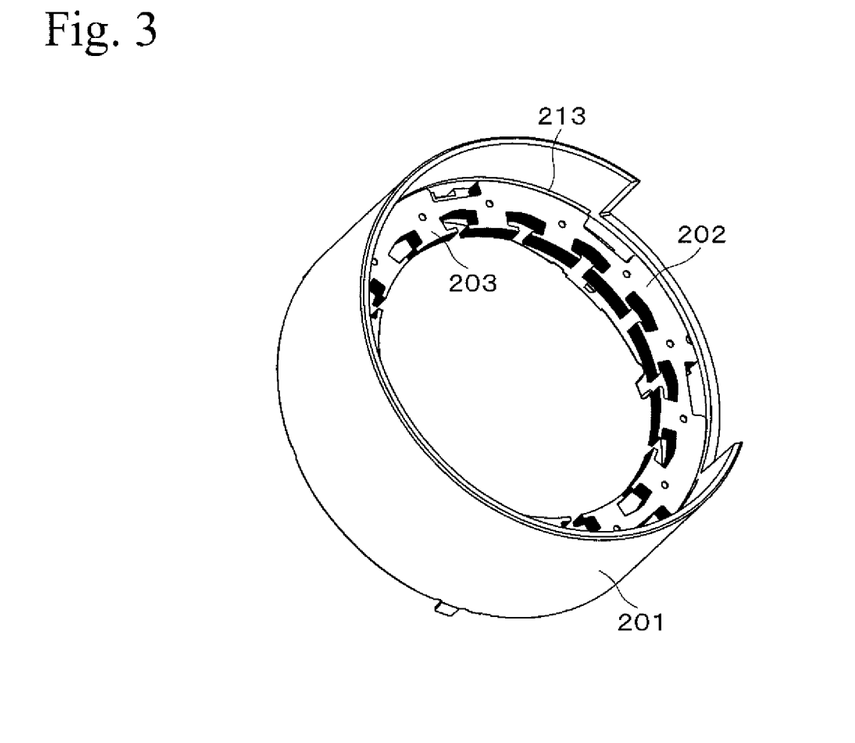
FIG. 3 is a perspective view showing a stator in an embodiment of the present invention.
Figure 4A:
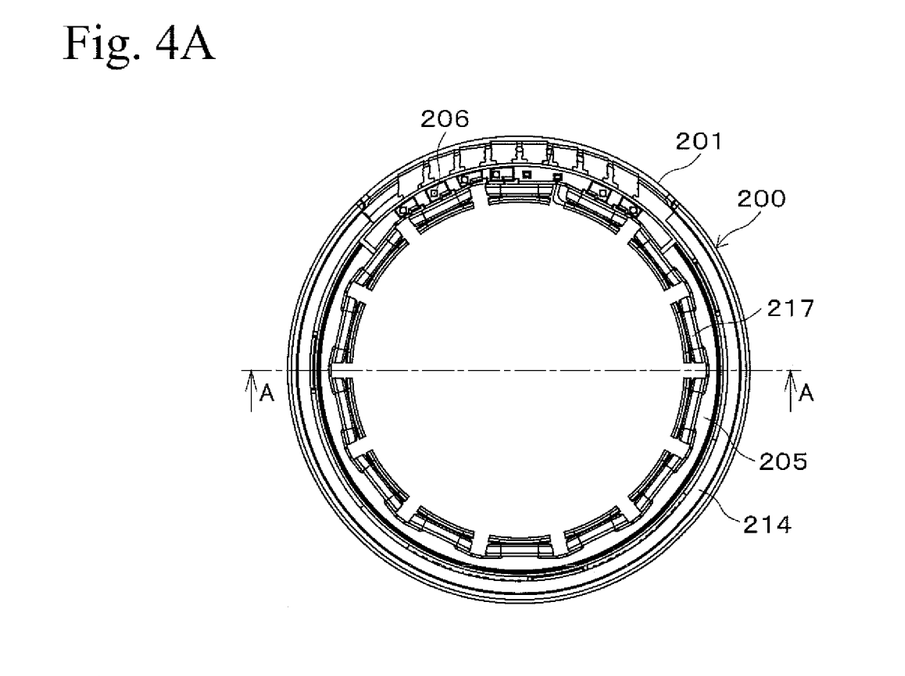
FIG. 4A is a front view viewed from an axial direction showing a stator in an embodiment of the present invention.
Figure 4B:
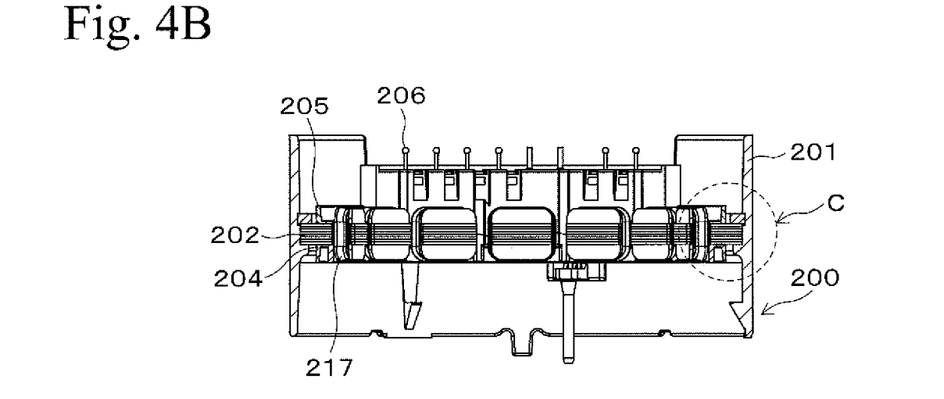
FIG. 4B is a side cross sectional view thereof.
Figure 5A:
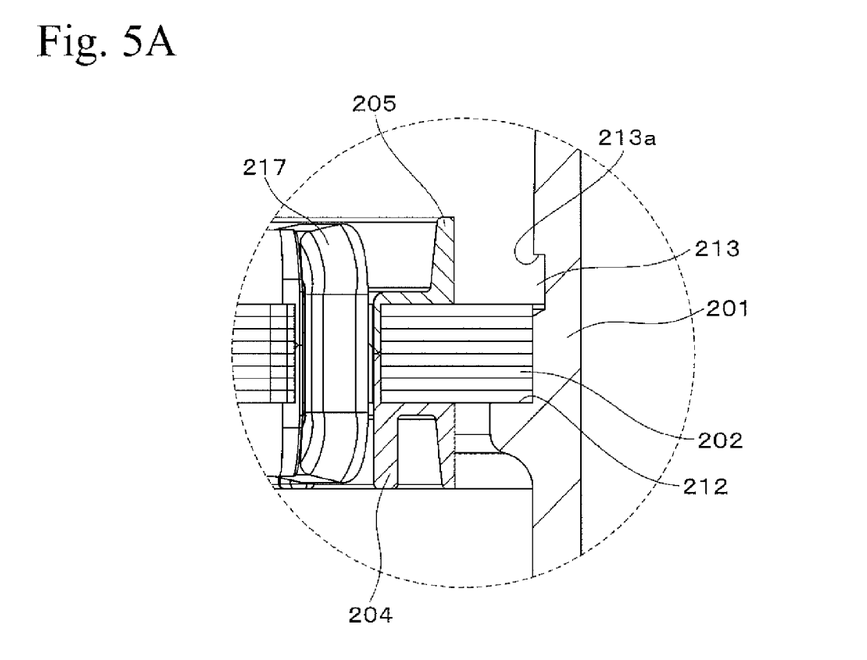
FIGS. 5A and 5B are enlarged views of a part in FIG. 4.
Figure 5B:
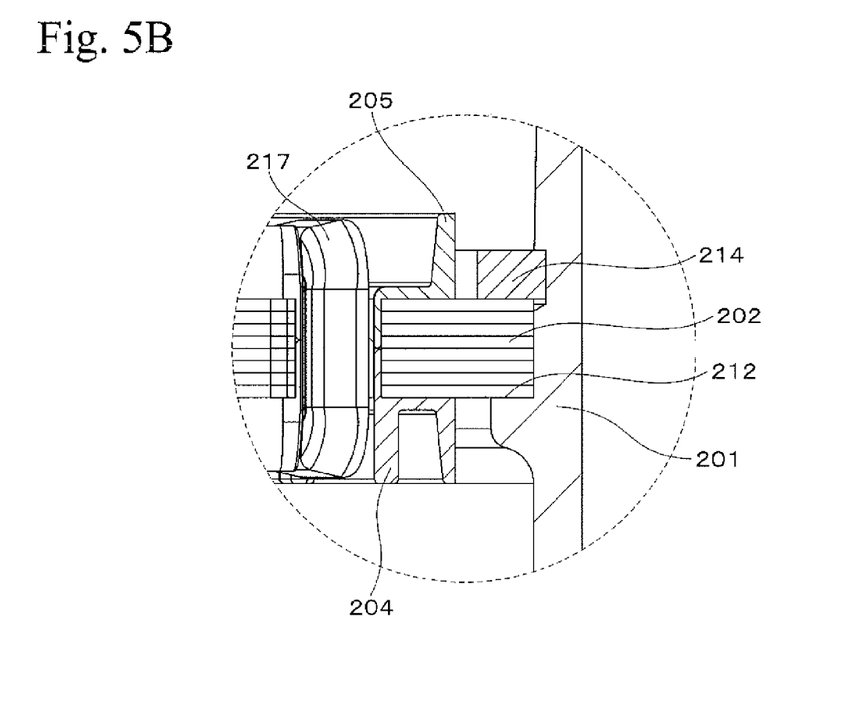

FIG. 3 shows a state in which the stator core 202 has been installed in the housing 201. In FIG. 3, insulators 204, 205 and a C-shaped ring 214 described below are not described. FIG. 4 shows a state (A) viewed from an axial direction showing the stator 200, and a state (B) viewed from a perpendicular direction to an axial direction showing a cross sectional view by a line A-A in the state (A). FIG. 5 shows enlarged views of a part C surrounded in a circle by a broken line in FIG. 4B. In addition, FIG. 5A shows a state before the C-shaped ring 214 is engaged with a groove 213, and FIG. 5B shows a state in which the C-shaped ring 214 is engaged with a groove 213. Here, in FIGS. 4 and 5, stator coils 217 (exciting coils or output coils) wound around salient poles 203 (see FIGS. 2 and 3) are shown.

As shown in FIGS. 2 to 5, the groove 213 extending in a circumferential direction for engaging with the C-shaped ring is formed on the inside (inner circumferential surface) of the housing 201. In this example, the groove 213 is formed by cutting. The groove 213 is formed to have a longer length than that of the C-shaped ring 214. The C-shaped ring 214 has a shape in which a part of a circle is missing, and it is constituted by a metallic member having spring characteristics that is bent in an approximate C shape (an elastically deformable material). As the C-shaped ring 214, generally available concentric snap rings referred to as a C-shaped ring, etc., may be utilized. Of course, the C-shaped ring 214 may be produced by processing metallic material in a cylindrical shape.

In assembling, first, the insulators 204 and 205 are installed in the stator core 202 to obtain a stator assembly. In addition, the stator coils 217 are wound around the salient poles 203 insulated by the insulators 204 and 205. Then, the stator assembly is inserted from an upper side in an axial direction into the housing 201, and an undersurface of the stator core 201 is contacted with a stator core receiving surface 212. This state is shown in FIG. 5A.

Next, in a state shown in FIG. 5A, the C-shaped ring 214 is engaged with the groove 213. In this case, the C-shaped ring 214 is bent in an axial center direction, that is, it is bent so as to reduce the C shape, and the C-shaped ring 214 is engaged with the groove 213 by using elastic force that opens the bent state. Specifically, the C-shaped ring 214 is engaged with the groove 213 in the state shown in FIG. 5A, to obtain the state shown in FIG. 5B. Here, the C-shaped ring 214 is engaged with the groove 213 to leave the axial center by force for returning to an original shape (resiliency), as described above.

In the state shown in FIG. 5B, an upper surface in an axial direction of the stator core 202 is contacted with the C-shaped ring 214, and a lower surface in an axial direction of the stator core 202 is contacted with the stator core receiving surface 212. When in this state a gap is generated in the groove 213, the stator may be fixed by inserting a washer such as a shim for adjusting height (a spacer) and a wave washer, in this gap. According to this structure, the lower surface of the stator core 202 is supported by the stator core receiving surface 212, and the upper surface of the stator core 202 is supported by the C-shaped ring 214. Then, the stator core 202 is fixed to the housing 201 in a state sandwiched by both sides in an axial direction.

Figure 6A:
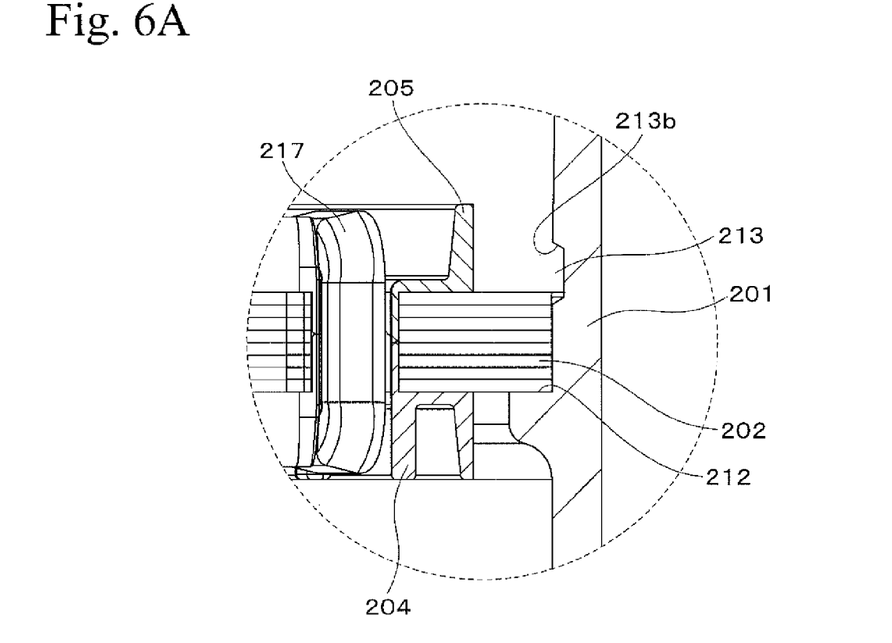
FIGS. 6A and 6B are alternative examples of FIGS. 5A and 5B.
Figure 6B:
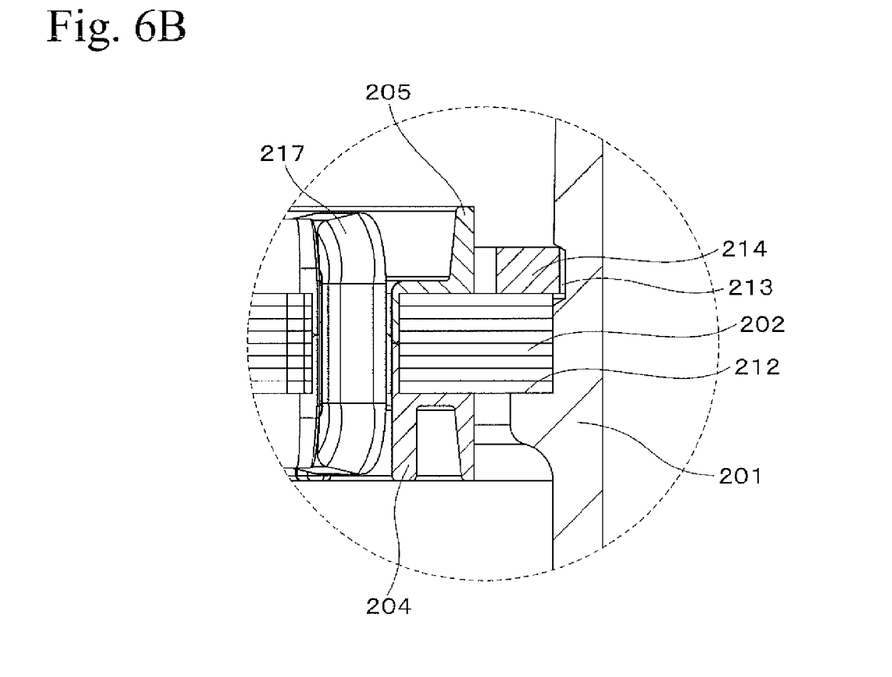

FIG. 6 shows an alternative example of the structure shown in FIG. 5. In the example shown in FIG. 6, a tapered portion 213b processed in a tapered shape is formed at an edge (corner portion) formed by an inner circumferential surface of the housing 201 and the groove 213 formed on the inner circumferential surface. According to this structure, the corner portion of the C-shaped ring 214 engaged with the groove 213 is contacted with a slope portion of the tapered portion 213b. Specifically, the C-shaped ring 214 is arranged in the groove 213 by bending so as to reduce the C shape, when the stator core 202 is fixed to the housing 201. The C-shaped ring 214 is received into the groove 213 by force for returning to an original shape. On the other hand, the above force for returning is changed to force in an axial direction by the tapered portion 213b formed in the groove 213, and the stator core 202 is pressed in a downward direction in figure by this force due to the C-shaped ring 214. As a result, the stator core 202 is pressed to the stator core receiving surface 212. Here, a cross-sectional shape of this tapered portion 213b is a straight line as is shown in FIG. 6; however, it may be a curved line.

Figure 7:
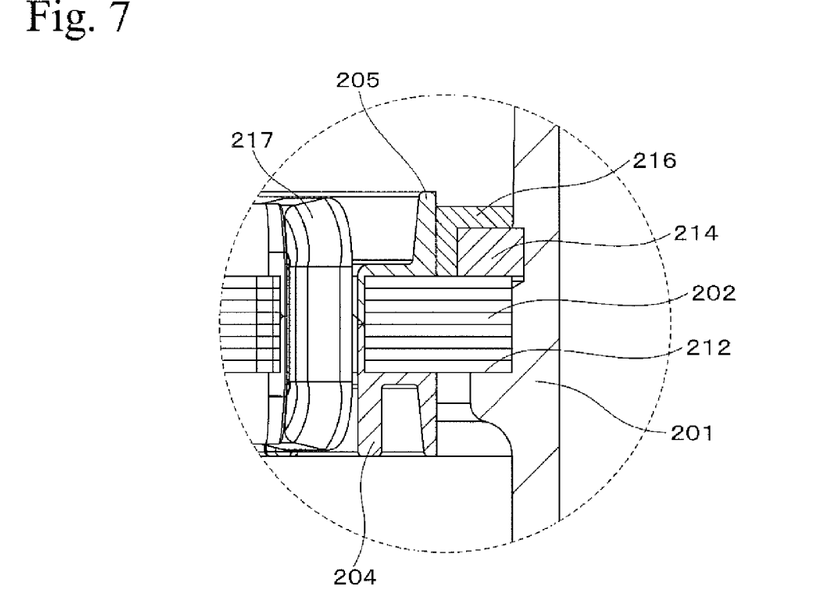
FIG. 7 is an alternative example of FIG. 5.

FIG. 7 shows an example in which adhesive 216 is applied to the C-shaped ring 214 after installing the C-shaped ring 214 in the structure shown in FIG. 5. In this case, the housing 201, the C-shaped ring 214 and the stator core 202 are fixed and reinforced by the adhesive 216. Therefore, a stronger structure can be obtained. Here, in the structure shown in FIG. 6, the adhesive may be used.

2. Second Embodiment

Figure 8:
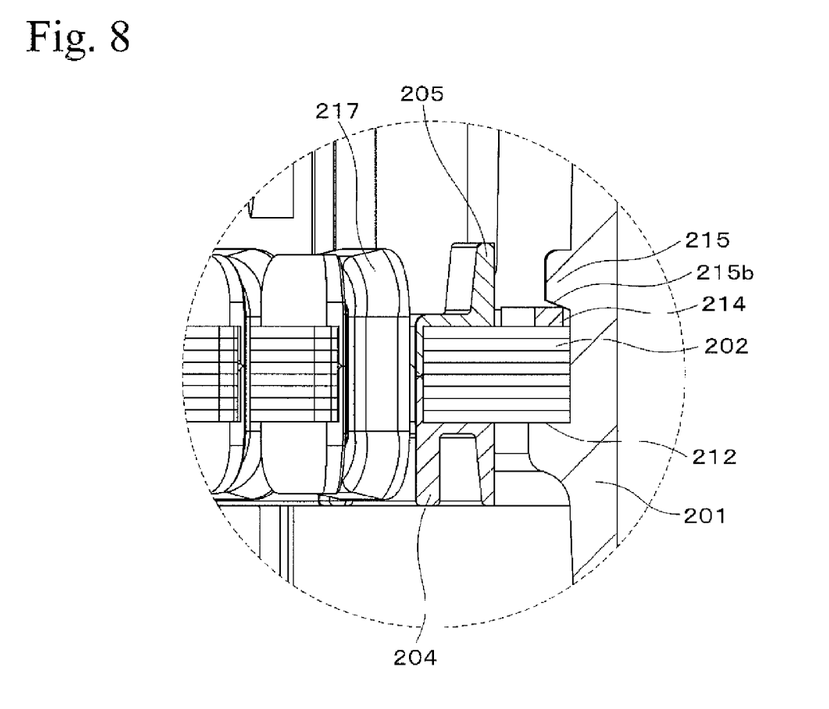
FIG. 8 is a side cross sectional view showing a resolver of another embodiment of the present invention.

FIG. 8 shows a part of a resolver according to a second embodiment of the present invention. The second embodiment shown in FIG. 8 is different from the first embodiment because multiple convexities 215 are formed along a circumferential direction in the housing 201. In the second embodiment shown in FIG. 8, the C-shaped ring 214 is engaged between the stator core 202 and the convexities 215. In this operation, the C-shaped ring 214 is bent in an axial center direction as well as the first embodiment, that is, it is bent so as to reduce the C shape, and the C-shaped ring 214 is engaged by using elastic force, which opens the bent state. Additionally, the multiple convexities 215 are provided at corresponding positions to stator grooves 202a shown in FIG. 2, so that it does not interfere with the stator core 202 when installing the stator core 202.

In addition, tapered portions 215b processed in a tapered shape are formed at corner portions of the multiple convexities 215 that contact the C-shaped ring 214. According to this structure, the corner portion of the C-shaped ring 214 that engages between the stator core 202 and the convexities 215 is contacted with slope portions of the tapered portions 215b. Specifically, the C-shaped ring 214 is arranged between the stator core 202 and the convexities 215 by bending so as to reduce the C shape, when the stator core 202 is fixed in the housing 201. In this case, the C-shaped ring 214 is received between the stator core 202 and the convexities 215 by force for returning to an original shape. Here, since the tapered portion 213b is formed on the convexities 215, a force, in which the stator core 202 is pressed in an axial direction by the C-shaped ring 214, is generated by the above force for returning. The stator core 202 is pressed to the stator core receiving surface 212 by this force. Here, a cross-sectional shape of this tapered portion 215b is a straight line, as shown in FIG. 8; however, it may be a curved line. In addition, the C-shaped ring 214 may be fixed by adhesive in the same manner as that of the first embodiment.

Advantages

As described above, the resolver 100 contains the approximately cylindrical housing 201, the stator core 202 fixed to the inside of the housing 201 in which an exciting coil and an output coil are wound therearound, and the rotor 300 arranged on an inner circumferential surface of the stator core 202, the groove 213 extending to a circumferential direction is formed on the inside of the housing 201, and the stator core 202 is fixed to the housing 201 by the C-shaped ring 214 that is engaged with this groove 213.

According to this structure, the stator core 202 is fixed to the housing 201 by providing with the C-shaped ring 214 in the groove 213 of the housing 201. This operation can be simply carried out without requiring a special jig.

In addition, in the structure using the tapered shape shown in FIG. 6, the edge surface of the stator core 202 is pressed by the C-shaped ring 214, and therefore, the stator core 202 can be more strongly fixed to the housing 201. Furthermore, in the structure using the adhesive shown in FIG. 7, reinforcement is carried out by the adhesive, and therefore, the stator core 202 can be more strongly fixed to the housing 201.

Other Matters

The housing 201 may be formed by resin molding. In addition, a cross-sectional shape of the C-shaped ring 214, viewed from a viewpoint of FIG. 4, may be formed to be a tapered shape such as a wedge shape, so that this tapered shape is contacted with an edge 213a of the groove 213. As a result, the C-shaped ring 214 is pressed downward in FIG. 4, and the stator core 202 is fixed.

The embodiment of the present invention is not limited to each of the above embodiments and includes various modifications that may be anticipated by one skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

What is claimed is:

1. A resolver comprising:
   a housing in an approximately cylindrical shape,
   a stator core in an approximately annular shape fixed to the inside of the housing, in which an exciting coil and a detecting coil are wound therearound,
   a rotor arranged on the inside of the stator core,
   a groove provided on the inside of the housing and extending in a circumferential direction, the groove comprising an edge with a tapered portion that is formed in a tapered shape, and
   a C-shaped ring engaged with the groove by being bent so as to reduce the C shape, the C-shaped ring fixing the stator core to the housing
   wherein the C-shaped ring contacts with the tapered portion and thereby presses that stator core in an axial direction.

2. The resolver according to claim 1, wherein multiple convexities are provided on the inside of the housing, and the stator core is fixed in the housing by engaging the C-shaped ring with an undersurface of the convexity.

3. The resolver according to claim 1, wherein an edge of the convexity is formed in a tapered shape.

4. The resolver according to claim 1, wherein an adhesive is coated on a portion in which the C-shaped ring is arranged.

5. The resolver according to claim 4, wherein a stator receiving surface which contacts with the stator core in an axial direction is provided on the inside of the housing, the stator core is sandwiched and held in an axial direction by the stator receiving surface and the C-shaped ring, and the stator core is pressed to the stator receiving surface by the C-shaped ring.

* * * * *